US010670890B2

(12) United States Patent
Graff et al.

(10) Patent No.: US 10,670,890 B2
(45) Date of Patent: Jun. 2, 2020

(54) AUDIO EYEGLASSES WITH CABLE-THROUGH HINGE AND RELATED FLEXIBLE PRINTED CIRCUIT

(71) Applicant: Bose Corporation, Framingham, MA (US)

(72) Inventors: Allen Timothy Graff, Sutton, MA (US); Cedric Bosch, San Jose, CA (US); Nathan David Schaal, San Francisco, CA (US); Edgardo Alicea, Brockton, MA (US); Vincent James Lee, San Francisco, CA (US); Ryan Richard Meganck, Pleasant Hill, CA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/442,813

(22) Filed: Jun. 17, 2019

(65) Prior Publication Data
US 2020/0041821 A1 Feb. 6, 2020

Related U.S. Application Data

(63) Continuation of application No. 16/050,682, filed on Jul. 31, 2018, now Pat. No. 10,353,221.

(51) Int. Cl.
*H04R 1/00* (2006.01)
*G02C 11/00* (2006.01)
(Continued)

(52) U.S. Cl.
CPC ............ *G02C 11/10* (2013.01); *G02C 5/2209* (2013.01); *G02C 5/2263* (2013.01); *G02C 11/06* (2013.01);
(Continued)

(58) Field of Classification Search
CPC .... H04R 1/1033; H04R 1/1066; G02C 11/10; G02B 27/017
See application file for complete search history.

(56) References Cited

U.S. PATENT DOCUMENTS

2002/0163486 A1* 11/2002 Ronzani ............... G02B 27/017
345/87
2005/0201585 A1 9/2005 Jannard et al.
(Continued)

FOREIGN PATENT DOCUMENTS

EP 3062144 A1 8/2016
WO 2013175367 A1 11/2013
(Continued)

OTHER PUBLICATIONS

Communication relating to the results of the partial international search for corresponding PCT Application No. PCT/US2019/044413 dated Oct. 16, 2019, 16 pages.

*Primary Examiner* — Matthew A Eason
(74) *Attorney, Agent, or Firm* — Hoffman Warnick LLC

(57) ABSTRACT

Various aspects include audio eyeglasses with through-hinge wiring configurations. In particular aspects, audio eyeglasses include: a frame for resting on a head of a user, the frame comprising: a lens region; a pair of arms extending from the lens region; and a hinge coupling the lens region and one of the pair of arms, the hinge comprising: a body; a friction element coupled to the body for damping the movement of the arm relative to the lens region; and a cavity within the body, the cavity sized to accommodate a cable extending therethrough, the hinge permitting movement of the arm relative to the lens region; and an electro-acoustic transducer at least partially housed in the frame and comprising a sound-radiating surface for providing an audio output.

19 Claims, 7 Drawing Sheets

(51) Int. Cl.
    *G02C 5/22*    (2006.01)
    *H04R 1/10*    (2006.01)
    *G02C 11/06*   (2006.01)
    *H04R 5/02*    (2006.01)
    *H04R 1/02*    (2006.01)
    *H04R 5/033*   (2006.01)

(52) U.S. Cl.
    CPC ........... *H04R 1/105* (2013.01); *H04R 1/1008* (2013.01); *H04R 1/1033* (2013.01); *H04R 1/1066* (2013.01); *H04R 5/02* (2013.01); *H04R 1/028* (2013.01); *H04R 1/1041* (2013.01); *H04R 5/033* (2013.01); *H04R 2420/07* (2013.01)

(56) References Cited

U.S. PATENT DOCUMENTS

| | | | |
|---|---|---|---|
| 2008/0013041 A1 | 1/2008 | Chou | |
| 2013/0235331 A1* | 9/2013 | Heinrich | G02C 11/10 351/158 |
| 2017/0108713 A1* | 4/2017 | Blum | G02C 7/083 |

FOREIGN PATENT DOCUMENTS

| | | | |
|---|---|---|---|
| WO | 2013188805 A2 | 12/2013 | |
| WO | 2018005136 A1 | 1/2018 | |

* cited by examiner

AUDIO EYEGLASSES WITH CABLE-THROUGH HINGE AND RELATED FLEXIBLE PRINTED CIRCUIT

PRIORITY CLAIM

This application is a continuation application of U.S. patent application Ser. No. 16/050,682, filed on Jul. 31, 2018, which is herein incorporated by reference in its entirety.

TECHNICAL FIELD

This disclosure generally relates to audio eyeglasses. More particularly, the disclosure relates to audio eyeglasses with through-hinge wiring.

BACKGROUND

Wearable audio devices, such as off-ear headphones, produce sound using an electro-acoustic transducer that is spaced from the user's ear. These wearable audio devices may take various form factors. In some cases, these wearable audio devices include audio eyeglasses configured to rest on the ears and nose of the user. The audio eyeglasses can include transducers proximate one or both of the user's ears, e.g., located on the arms of the eyeglasses. However, supplying power to these transducers, as well as enabling hard-wired communication through the frame of the audio eyeglasses, can be challenging in this audio device form factor.

SUMMARY

All examples and features mentioned below can be combined in any technically possible way.

Various implementations of the disclosure include audio eyeglasses with through-hinge wiring configurations.

In some particular aspects, audio eyeglasses include: a frame for resting on a head of a user, the frame having: a lens region; a pair of arms extending from the lens region; and a hinge coupling the lens region and one of the pair of arms, the hinge including: a body; and a cavity within the body, the cavity sized to accommodate a cable extending therethrough, the hinge permitting movement of the arm relative to the lens region; and an electro-acoustic transducer at least partially housed in the frame and having a sound-radiating surface for providing an audio output.

In other particular aspects, audio eyeglasses include: a frame for resting on a head of a user, the frame having: a lens region; a pair of arms extending from the lens region; and a flexible printed circuit (FPC) extending from the lens region to at least one of the pair of arms, the FPC including: a first segment located in the lens region, the first segment having two layers of conductive material connected by at least one via and separated by an insulating layer; and a second segment continuous with the first segment and located proximate a joint between the lens region and the at least one of the pair of arms, the second segment including: only a first one of the two layers of conductive material, and the insulating layer; and an electro-acoustic transducer connected with the FPC, the electro-acoustic transducer at least partially housed in the frame and having a sound-radiating surface for providing an audio output.

In additional particular aspects, audio eyeglasses include: a frame for resting on a head of a user, the frame having: a lens region; a pair of arms extending from the lens region; a hinge coupling the lens region and one of the pair of arms, the hinge including: a body; and a cavity within the body, the hinge permitting movement of the arm relative to the lens region; and a flexible printed circuit (FPC) extending from the lens region to at least one of the pair of arms through the cavity in the hinge; and an electro-acoustic transducer connected with the FPC, the electro-acoustic transducer at least partially housed in the frame and having a sound-radiating surface for providing an audio output.

In further particular aspects, audio eyeglasses include: a frame for resting on a head of a user, the frame comprising: a lens region; a pair of arms extending from the lens region; and a hinge coupling the lens region and one of the pair of arms, the hinge comprising: a body; a friction element coupled to the body for damping the movement of the arm relative to the lens region; and a cavity within the body, the cavity sized to accommodate a cable extending therethrough, the hinge permitting movement of the arm relative to the lens region; and an electro-acoustic transducer at least partially housed in the frame and comprising a sound-radiating surface for providing an audio output.

Implementations may include one of the following features, or any combination thereof.

In certain implementations, the audio eyeglasses include a friction element coupled to the body for damping the movement of the arm relative to the lens region. In particular cases, the friction element includes at least one of a silicone damper or a spring-loaded device.

In some aspects, the audio eyeglasses include an additional hinge coupling the lens region and the second one of the pair of arms, the additional hinge having: a body; and a cavity within the body, the cavity sized to accommodate the cable extending therethrough.

In certain cases, the electro-acoustic transducer is mounted in a first one of the arms that is coupled to the lens region by the hinge, and the cable is fixed at a first location to a circuit board in the other one of the arms, extends through the lens region, and is fixed at a second location proximate the electro-acoustic transducer in the first one of the arms. In particular aspects, the cable further includes at least one bend contained within the cavity for controlling tension on the cable during the movement of the arm relative to the lens region.

In some implementations, the audio eyeglasses further include a set of pins coupling the hinge to the arm.

In certain aspects, the hinge substantially obstructs the cable from view when the audio eyeglasses are in an open position, and completely obstructs the cable from view when the audio eyeglasses are in a closed position.

In particular cases, the cable comprises a flexible printed circuit (FPC).

In some aspects, the joint between the lens region and the at least one of the pair of arms includes a hinge, the hinge having: a body; and a cavity within the body, the cavity sized to accommodate the FPC extending therethrough, the hinge permitting movement of the arm relative to the lens region. In certain cases, the FPC transitions from the first segment to the second segment proximate the hinge, such that the second segment passes through the cavity in the hinge and the first segment remains outside of the cavity in the hinge.

In certain implementations, the FPC extends through both of the pair of arms and the lens region, and the second segment is only located proximate respective joints between the lens region and the pair of arms.

In particular aspects, the two layers of conductive material include the first conductive material layer and a second, distinct conductive material layer, where the first conductive material layer is thinner than the second conductive material layer. In some implementations, the second conductive material layer has a thickness at least three times a thickness of the first conductive material layer.

In certain cases, the first segment has a lesser impedance than the second segment, and the second segment has a greater bend cycle life than the first segment.

In particular aspects, the audio eyeglasses further include a first additional insulating layer adjacent one of the two layers of conductive material and a second additional insulating layer adjacent the other one of the two layers of conductive material.

In some implementations, the cavity has a first opening to a pathway in the lens region, and a second opening to an additional pathway in the arm, where the first opening and the second opening are wider than the cable, and wherein the first opening is wider than the second opening.

In certain aspects, the first opening has a width that is approximately 3-5 times a width of the second opening.

In particular cases, the hinge has a contoured edge at an interface with the arm and an additional contoured edge at a surface thereof adjacent the second opening.

In some aspects, the hinge is fixed within a slot in the lens region.

In certain implementations, the audio eyeglasses further include a set of pins coupling the hinge to the arm.

In particular aspects, the set of pins includes an upper pin and a lower pin each extending through a respective mating slot in the hinge, where neither the upper pin nor the lower pin extends through the cavity to interfere with the cable.

In certain implementations, the friction element is coupled with an outer surface of the body.

In some cases, the friction element extends into a slot or a mating groove in the body.

In particular implementations, the audio eyeglasses further include an additional hinge coupling the lens region and the second one of the pair of arms, the additional hinge including: a body; a friction element coupled to the body for damping the movement of the arm relative to the lens region; and a cavity within the body, the cavity sized to accommodate the cable extending therethrough.

In certain aspects, the audio eyeglasses further include: a controller connected with the electro-acoustic transducer; and an interface connected with the controller.

In some implementations, the interface includes a button or a capacitive touch interface.

In particular cases, the interface includes a compressible interface that allows a user to squeeze one or more sections of the arms to initiate a user interface command.

In some aspects, the audio eyeglasses further include an inertial measurement unit (IMU) connected with the controller for enabling at least one of location-based control functions or orientation-based control functions.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
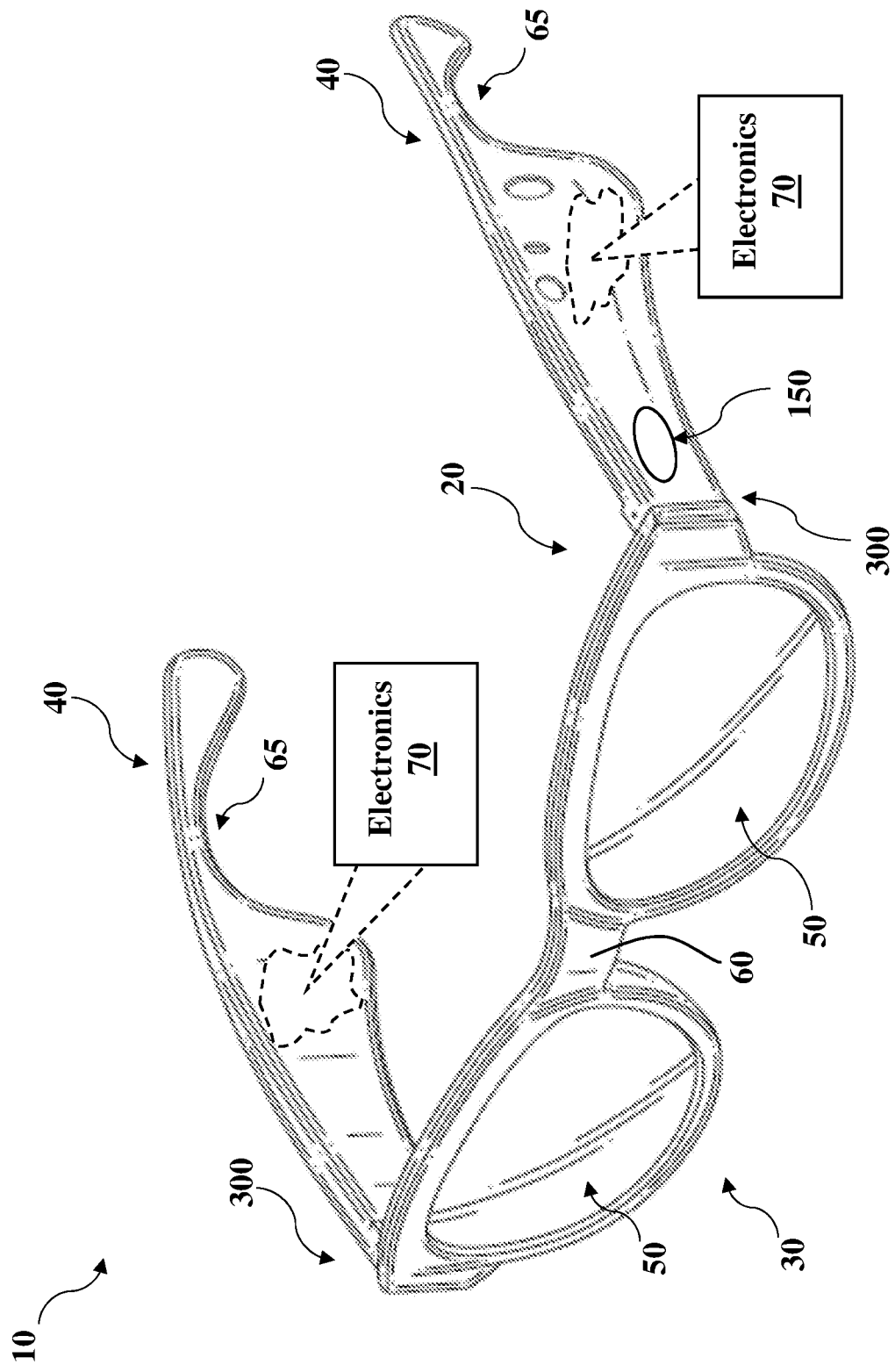
FIG. 1 shows a schematic depiction of audio eyeglasses according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to audio eyeglasses with through-hinge wiring. More particularly, aspects of the disclosure relate to audio eyeglasses having a hinge with a wiring cavity, along with wiring for through-hinge audio eyeglasses.

Commonly labeled components in the FIGURES are considered to be substantially equivalent components for the purposes of illustration, and redundant discussion of those components is omitted for clarity.

Components shown and described herein can be formed according to various manufacturing techniques, for example, molding, casting, additive manufacturing (e.g., 3D printing), etc. Where specific techniques are not described, conventional manufacturing approaches can be used to form the components and structures disclosed according to various implementations.

Aspects and implementations disclosed herein may be applicable to a wide variety of speaker systems, such as wearable audio devices in various form factors, with particular application to audio eyeglasses or other head-mounted audio devices. Unless specified otherwise, the term wearable audio device, as used in this document, includes headphones and various other types of personal audio devices such as head, shoulder or body-worn acoustic devices that include one or more acoustic drivers to produce sound, with or without contacting the ears of a user. Some aspects disclosed may be particularly applicable to personal (wearable) audio devices such as audio eyeglasses or other head-mounted audio devices. It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to speaker systems that either do or do not support two-way communications, and either do or do not support active noise reduction (ANR). For speaker systems that do support either two-way communications or ANR, it is intended that what is disclosed and claimed herein is applicable to a speaker system incorporating one or more microphones disposed on a portion of the speaker system that remains outside an ear when in use (e.g., feedforward microphones), on a portion that is inserted into a portion of an ear when in use (e.g., feedback microphones), or disposed on both of such portions. Still other implementations of speaker systems to which what is disclosed and what is claimed herein is applicable will be apparent to those skilled in the art.

As noted herein, off-ear headphones produce sound using an acoustic driver that is spaced (or, separated) from the ear of the user while in use. Audio eyeglasses (also referred to as eyeglass headphones) can include one or more dipole loudspeakers built into the eyeglass frame. Dipole loudspeakers produce out-of-phase sound from opposite sides of the loudspeaker's electro-acoustic transducer. The sound can be emitted from openings or vents in the eyeglass frame. If one vent is close to an ear and the other vent is farther from the ear, quality sound can be delivered to the ear with minimal spillage. Examples of off-ear headphones with dipole loudspeakers are disclosed in U.S. Pat. No. 9,794,676 and U.S. patent application Ser. No. 15/375,119, both of which are herein incorporated by reference in their entireties. Additional aspects of off-ear headphones are described in U.S. patent application Ser. No. 15/884,924 and U.S. patent application Ser. No. 15/992,982, both of which are herein also incorporated by reference in their entirety. Additionally, designs of particular off-ear headphones are included in U.S. Design patent application Ser. No. 29/639,191, which is herein also incorporated by reference in its entirety.

While described as audio eyeglasses, or eyeglass headphones herein, the wearable audio devices disclosed herein can include additional features and capabilities. That is, the audio eyeglasses described according to various implementations can include features found in one or more other wearable electronic devices, such as smart glasses, smart watches, etc., or any other wearable audio device where wiring to an electro-acoustic transducer must pass through a hinge. These audio eyeglasses can include additional hardware components, such as one or more cameras, location tracking devices, microphones, etc., and may be capable of voice recognition, visual recognition, and other smart device functions. The description of audio eyeglasses included herein is not intended to exclude these additional capabilities in such a device.

FIG. 1 is a schematic depiction of audio eyeglasses 10 according to various implementations. As shown, the audio eyeglasses 10 can include a frame 20 having a lens region 30 and a pair of arms 40 extending from the lens region 30. As with conventional eyeglasses, the lens region 30 and arms 40 are designed for resting on the head of a user. The lens region 30 can include a set of lenses 50, which can include prescription, non-prescription and/or light-filtering lenses, as well as a bridge 60 (which may include padding) for resting on the user's nose. Arms 40 can include a contour 65 for resting on the user's respective ears.

Contained within the frame 20 (or substantially contained, such that a component can extend beyond the boundary of the frame) are electronics 70 and other components for controlling the audio eyeglasses 10 according to particular implementations. In some cases, separate, or duplicate sets of electronics 70 are contained in portions of the frame, e.g., each of the respective arms 40 in the frame 20. However, certain components described herein can also be present in singular form.

Figure 2:
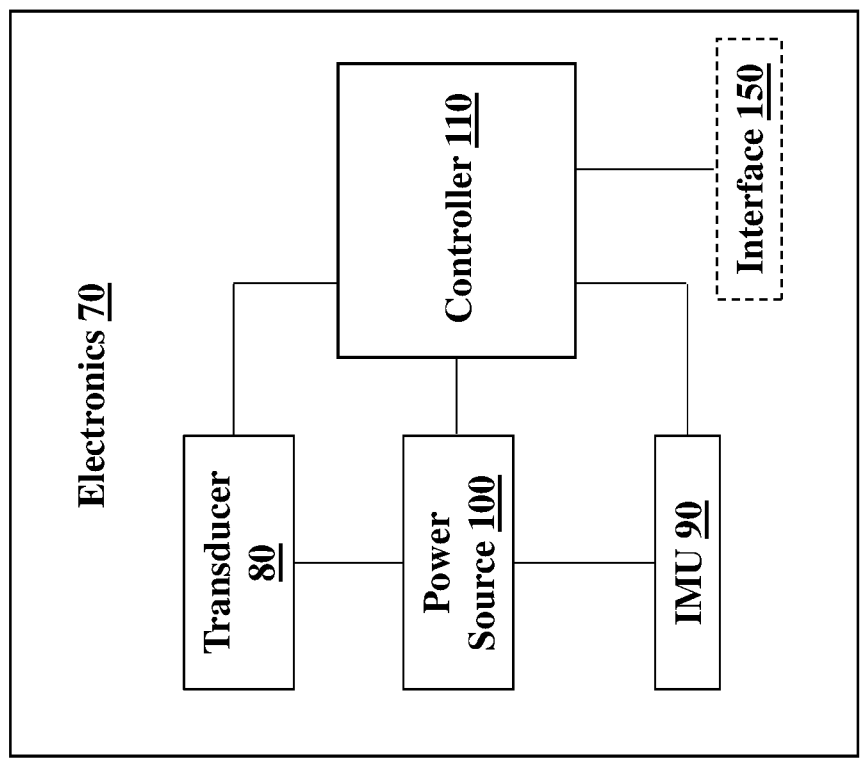
FIG. 2 is a schematic depiction of select electronics substantially contained in the audio eyeglasses of FIG. 1.

FIG. 2 shows a schematic depiction of the electronics 70 contained within the frame 20 (FIG. 1). It is understood that one or more of the components in electronics 70 may be implemented as hardware and/or software, and that such components may be connected by any conventional means (e.g., hard-wired and/or wireless connection). It is further understood that any component described as connected or coupled to another component in audio eyeglasses 10 or other systems disclosed according to implementations may communicate using any conventional hard-wired connection and/or additional communications protocols. In some cases, communications protocol(s) can include a Wi-Fi protocol using a wireless local area network (LAN), a communication protocol such as IEEE 802.11 b/g, a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio eyeglasses 10 are configured to communicate using one or more conventional wireless transceivers.

As shown in FIG. 2, electronics 70 contained within the frame 20 (FIG. 1) can include a transducer 80, an inertial measurement unit (IMU) 90, and a power source 100. In various implementations, the power source 100 is connected to the transducer 80, and can additionally be connected to the IMU 90. Each of the transducer 80, IMU 90 and power source 100 are connected with a controller 110, which is configured to perform control functions according to various implementations described herein. Electronics 70 can include other components not specifically depicted herein, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. It is understood that these components or functional equivalents of these components can be connected with, or form part of, the controller 110.

The transducer 80 can include at least one electroacoustic transducer for producing an acoustic output proximate the ears of a user. In some particular cases, at least two electroacoustic transducers 80 are positioned proximate (but physically separated from) the ears of the user (e.g., one transducer 80 proximate each ear). However, it is understood that in other cases, transducers 80 can be positioned extending from arms 40 such that they (or their respective housings or structures for interfacing with the ear) physically contact the ears of the user. In certain implementations, each transducer 80 can include a dipole loudspeaker with an acoustic driver or radiator that emits front-side acoustic radiation from its front side, and emits rear-side acoustic radiation to its rear side. The dipole loudspeaker can be built into the frame 20 of the audio eyeglasses 10 (FIG. 1). A housing can direct the front-side acoustic radiation and a housing can direct the rear-side acoustic radiation. A plurality of sound-conducting vents (openings) in the housing allow sound to leave the housing. Openings in the eyeglass frame 20 can be aligned with these vents, so that the sound also leaves the frame 20. In these cases, a distance between the sound-conducting openings defines an effective length of an acoustic dipole of the loudspeaker. The effective length may be considered to be the distance between the two openings that contribute most to the emitted radiation at any particular frequency. The housing and its openings can be constructed and arranged such that the effective dipole length is frequency dependent. In certain cases, the transducer 80 (e.g., loudspeaker dipole transducer) is able to achieve a greater ratio of sound pressure delivered to the ear to spilled sound, as compared to an off-ear headphone not having this feature.

The IMU 90 can include a microelectromechanical system (MEMS) device that combines a multi-axis accelerometer, gyroscope, and/or magnetometer. It is understood that additional or alternative sensors may perform functions of the IMU 90, e.g., an optical-based tracking system, accelerometer, magnetometer, gyroscope or radar for detecting movement as described herein. The IMU 90 can be configured to detect changes in the physical location and/or orientation of the audio eyeglasses 10 to enable location/orientation-based control functions. It is understood that the electronics 70 could also include one or more optical or visual detection systems located at the audio eyeglasses 10 or another connected device configured to detect the location/orientation of the audio eyeglasses 10. In any case, the IMU 90 (and/or additional sensors) can provide sensor data to the controller 110 about the location and/or orientation of the audio eyeglasses 10.

The power source 100 to the transducer 80 can be provided locally (e.g., with a battery in each of the temple regions of the frame 20), or a single battery can transfer power via wiring that passes through the frame 20 or is otherwise transferred from one temple to the other. The power source 100 can be used to control operation of the transducer 80, according to various implementations.

The controller 110 can include conventional hardware and/or software components for executing program instructions or code according to processes described herein. For example, controller 110 may include one or more processors, memory, communications pathways between components, and/or one or more logic engines for executing program code. Controller 110 can be coupled with other components in the electronics 70 via any conventional wireless and/or hardwired connection which allows controller 110 to send/receive signals to/from those components and control operation thereof.

Returning to FIG. 1 (and with reference to FIG. 2), in certain implementations, the audio eyeglasses 10 include an interface 150, which is connected with the controller 110. In these cases, the interface 150 can be used for functions such as audio selection, powering on the audio eyeglasses or engaging a voice control function. In certain cases, the interface 150 includes a button or a capacitive touch interface. In some additional implementations, the interface 150 includes a compressible interface, which can allow a user to squeeze one or more sections of the audio eyeglasses 10 (e.g., arms 40) to initiate a user interface command. The interface 150 shown in FIG. 1 is merely intended to illustrate one example of an interface (e.g., a button or capacitive touch interface). It is understood that interface functions can be integrated into the frame of the audio eyeglasses 10 such that the interface may not be visible to the naked eye.

Figure 3:
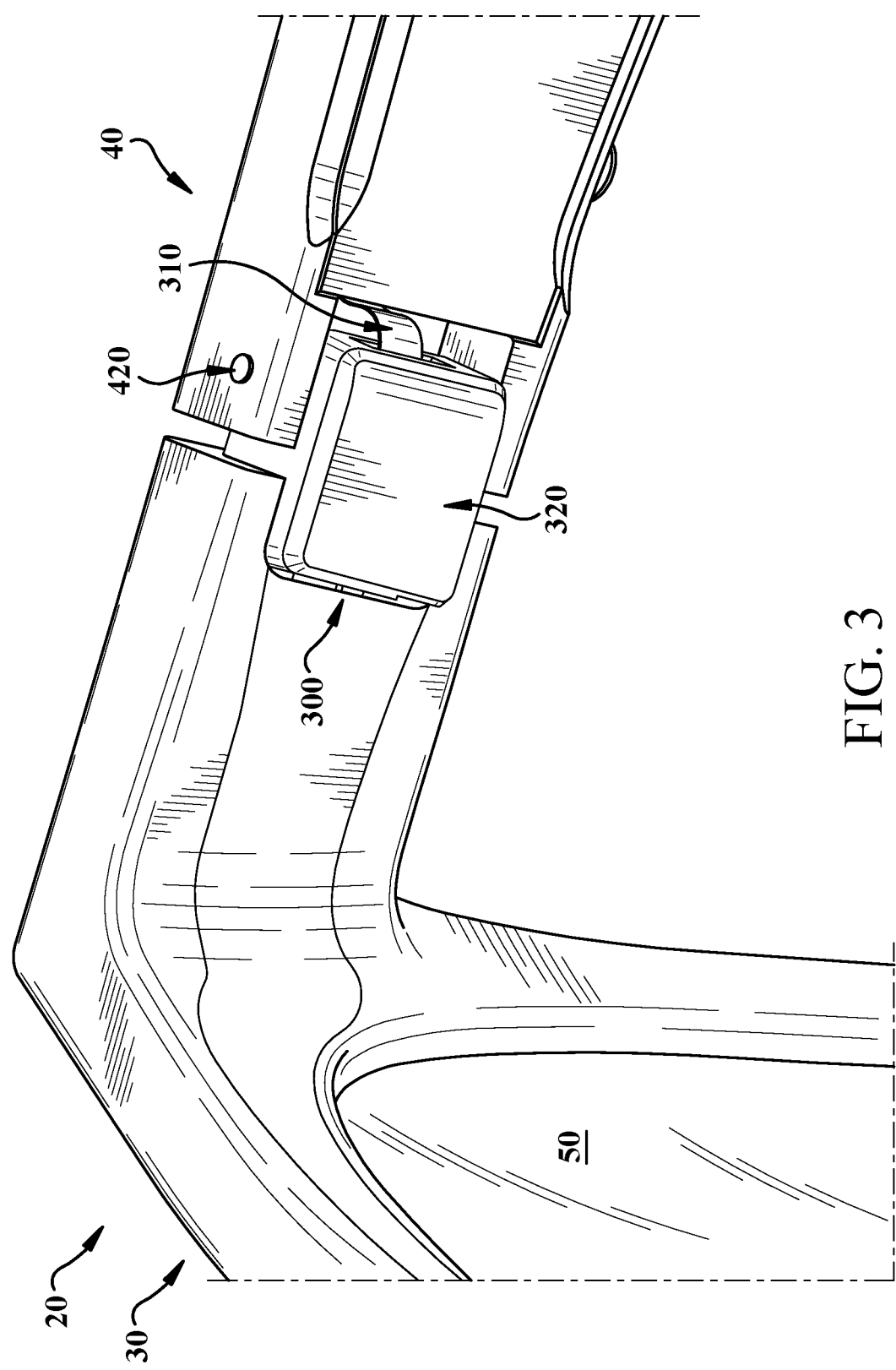
FIG. 3 shows a schematic depiction of a hinge in audio eyeglasses according to various implementations.
Figure 4:
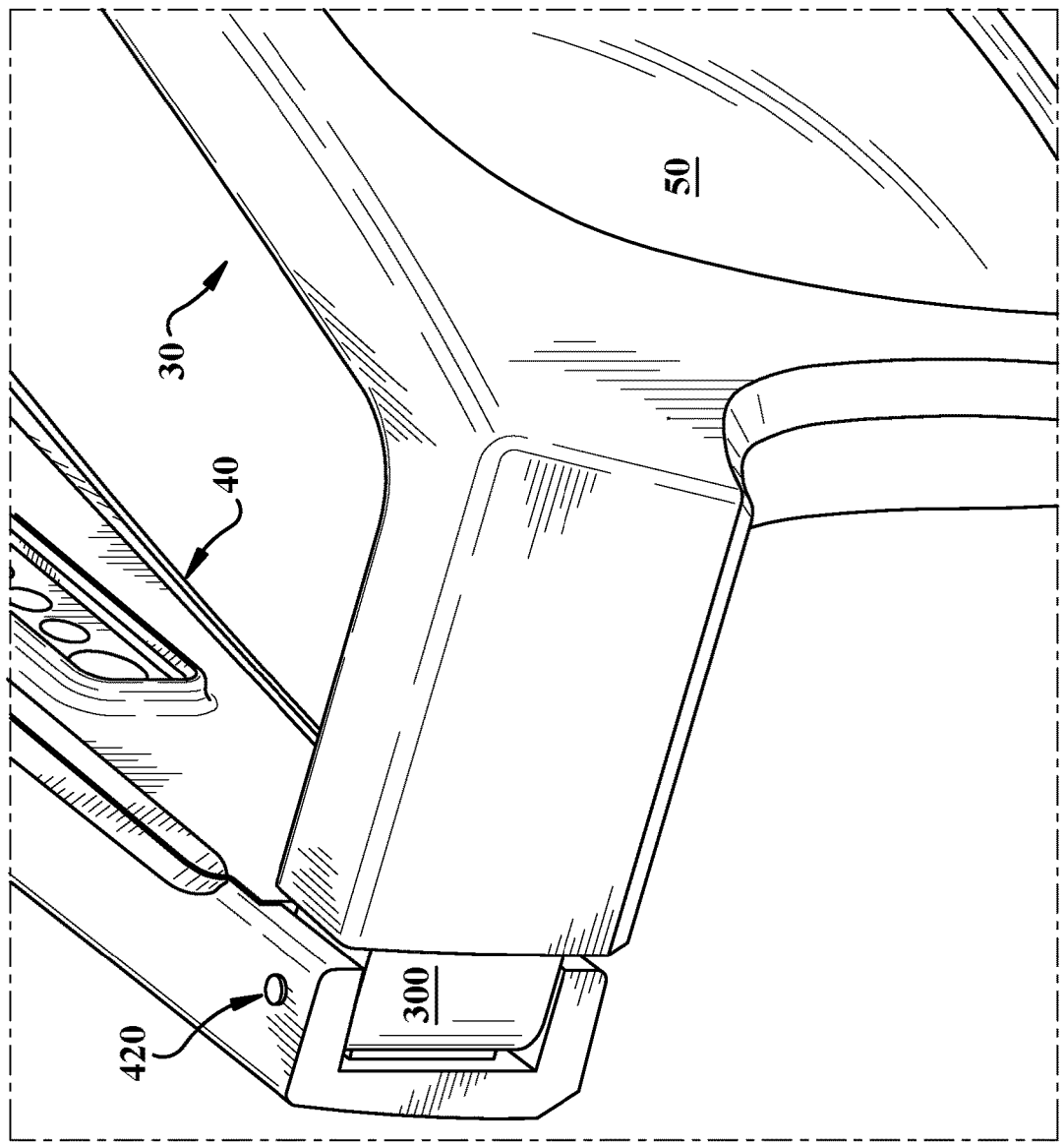
FIG. 4 is an additional perspective view of the hinge in the audio eyeglasses of FIG. 3.

Shown in FIG. 1, but more particularly illustrated in the perspective view of FIGS. 3 and 4, the audio eyeglasses 10 can also include a hinge 300 coupling the lens region 30 and one of the pair of arms 40. As shown in FIG. 1, in some cases, the audio eyeglasses 10 include two hinges 300, one for coupling each arm 40 to the lens region 30. However, it is understood that audio eyeglasses can include a single one of the hinges 300 illustrated in FIGS. 3 and 4 (and include a conventional eyeglass hinge at the other junction of an arm and the lens region 30. In particular implementations, the hinge 300 is formed of a metal such as stainless steel (e.g., using metal injection molding (MIM)), and can be coated, e.g., using a physical vapor deposition (PVD) process. A remainder of the frame 20 can be formed substantially of a plastic or composite material.

Returning to FIG. 3, the hinge 300 is shown in this perspective from the inside of the frame 20, joining the lens region 30 with the right arm 40 of the audio eyeglasses 10. In this depiction, the hinge 300 is in a substantially open position. As discussed further herein, the hinge 300 can permit movement (e.g., pivoting) of the arm 40 relative to the lens region 30 of the frame 20, but can be configured to accommodate a cable 310 extending through the hinge 300, e.g., to connect to one or more components in the electronics 70 (FIG. 1) in the arm(s) 40. FIG. 4 illustrates a perspective view of the audio eyeglasses 10 from the opposite side of the frame 20, in a substantially closed position.

Figure 5:
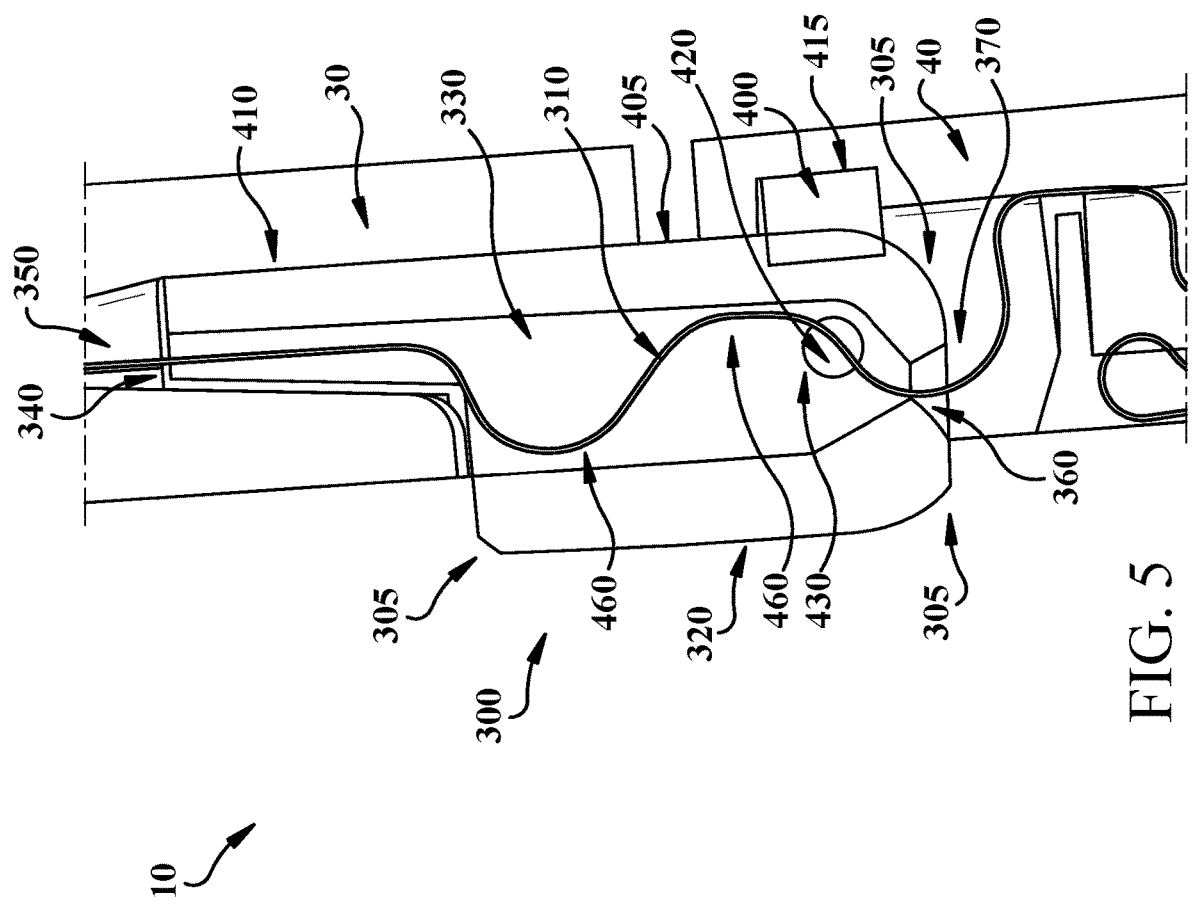
FIG. 5 is a cross-sectional view of a hinge according to various implementations.

FIG. 5 is a top cross-sectional view of the hinge 300 coupling the arm 40 to the lens region 30. As illustrated in this view (with continuing reference to FIGS. 3 and 4), the hinge 300 can include a body 320, and a cavity 330 extending through the body 320. The body 320 can be formed of one or more conventional materials used in the eyeglasses industry, such as plastics or composites. The cavity 330 is sized to accommodate the cable 310 extending therethrough, i.e., the cavity 330 has a first opening 340 (to a pathway 350 in the lens region 30) that is wider than a width of the cable 310 and a second opening 360 (to a pathway 370 in the arm 40) that is wider than the cable 310. In some cases, the first opening 340 is larger (wider) than the second opening 360, e.g., where the first opening 350 is approximately 3-5 times a size of the second opening 370. As described herein, in various implementations the cavity 330 includes a pathway that is sized to accommodate the cable 310, e.g., to permit the cable to bend or meander within the pathway between the openings 340, 360.

In particular implementations, the hinge 300 can include contoured edges 305 to reduce material fatigue during repeated usage. For example, contoured edges 305 at the interface with the arm 40 can be particularly helpful at reducing material fatigue. In some cases, the surfaces of the hinge 300 adjacent to the second opening 360 include contoured edges 305.

In various implementations, as shown in FIG. 5, the audio eyeglasses 10 can further include a friction element 400 coupled to the body 320. The friction element 400 can be configured to dampen the movement of the arm 40 relative to the lens region 30, for example, by applying a resistive force against the body 320 as the arm moves relative to the lens region 30. In some implementations, the friction element 400 is coupled with an outer surface 405 of the body 320, however, in other cases, the friction element 400 is integral with the body 320, such that the friction element 400 extends into the body 320, e.g., in a slot or mating groove. In some example implementations, as shown in FIG. 5, the friction element 400 can be positioned in a pocket 415 in the arm 40, and may fit between the body 320 and the arm 40 to perform damping functions described herein. In certain implementations, the friction element 400 is connected with the body 320 using a bonding agent or an adhesive, however, in other cases, the friction element 400 can be integrally formed with the body 320 (e.g., integrally molded, cast, or additively manufactured). In some cases, the friction element 400 includes a silicone damper or a spring-loaded device (e.g., a spring-mounted platform or contact pad) coupled with the body 320 and/or the arm 40.

In various implementations, the hinge 300 is fixed within a slot 410 in the lens region 30. For example, as shown in FIGS. 3 and 5, the slot 410 is sized to house the hinge 300, which can be fastened, or otherwise fixedly attached to the lens region 30 in the slot 410. In some cases, the hinge 300 is connected with the lens region 30 by an adhesive or bonding agent. In particular implementations, as shown in FIGS. 3-5, the audio eyeglasses can include a set of pins 420 coupling the hinge 300 to the arm 40. In some particular cases, at least two pins 420 are used to connect the hinge 300 to the arm 40, and permit the arm 40 to pivot relative to the lens region 30. Pin(s) 420 can extend through mating slot(s) 430 in the hinge 300. In certain cases, an upper pin 410 and lower pin 410 are used to couple the hinge 300 with the arm 40, such that neither pin extends through the cavity 330 to interfere with the cable 310.

As shown in FIG. 3, the hinge 300 substantially obstructs the cable 310 from view when the audio eyeglasses 10 are in an open position. That is, a user can see only a small portion of the cable 310 when the audio eyeglasses 10 are in the open position. This clearance between the outer surface of the hinge 300 and the casing of the arm 40 allows the arm 40 to pivot about the hinge 300 without obstructing movement of that arm 40. As shown in FIG. 4, the hinge 300 completely obstructs the cable 310 from view when the audio eyeglasses 10 are in a closed position. That is, the user cannot see any portion of the cable 310 when the audio eyeglasses are in the closed position.

Figure 6:
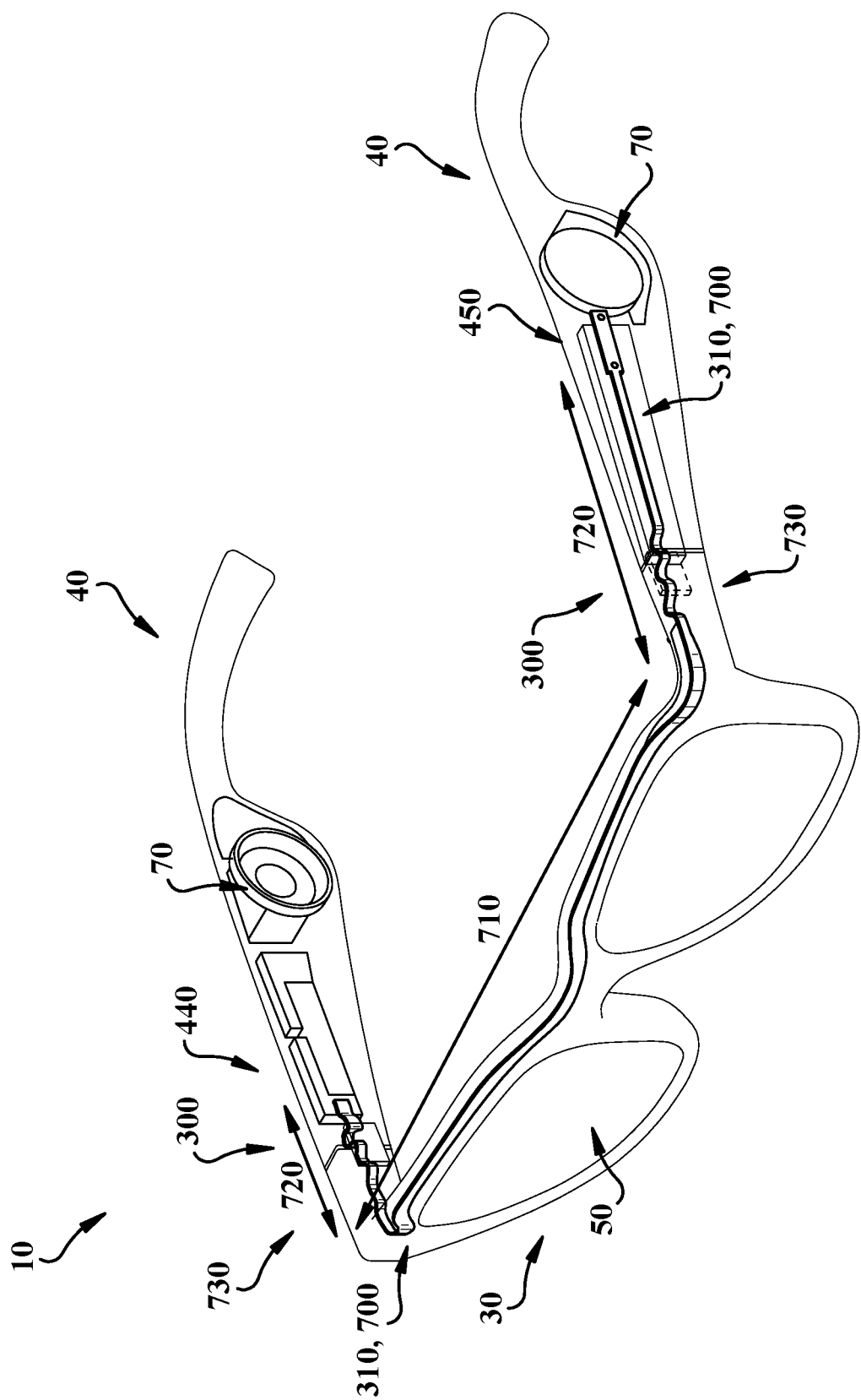
FIG. 6 shows a schematic partially transparent depiction of audio eyeglasses including a flexible printed circuit (FPC) according to various implementations.

As illustrated in the perspective view of the audio eyeglasses 10 in FIG. 6 (with continuing reference to FIG. 5), in various implementations, the cable 310 extends through the lens region 30 and is fixed at a first location 440 to a circuit board (not shown) in one of the arms 40, and is fixed at a second location 450 proximate the electro-acoustic transducer 80 in the other arm 40. The cable 310 runs through the hinge 300, but permits movement of the arm(s) 40 relative to the lens region 30. For example, as shown in FIG. 5, in some implementations, the cable 310 includes at least one bend 460 contained within the cavity 330 for controlling tension in the cable 310 during movement of the arm 40 relative to the lens region 30. That is, the bend 460 can be intentionally formed in the cable 310 to prevent unwanted tension in the cable 310 during movement of the arm 40 relative to the lens region 30. In some cases, one or more additional bends 460 are formed in the cable 310 to control tension in the cable 310 during movement.

Figure 7:
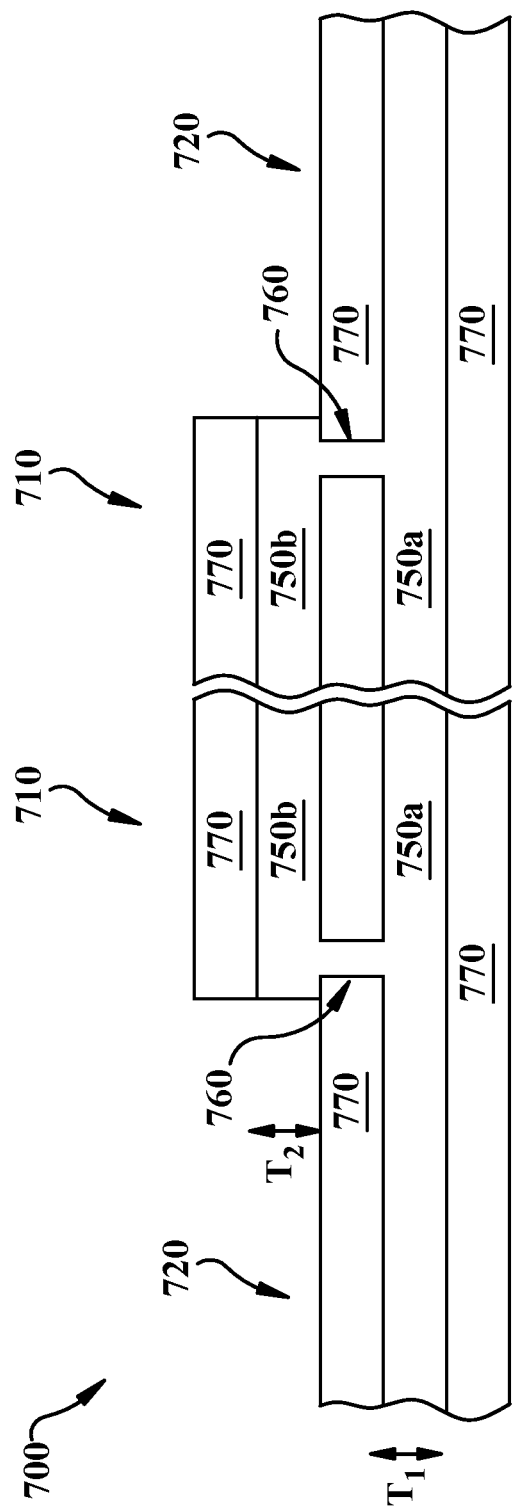
FIG. 7 is a cross-sectional depiction of an FPC according to various implementations.

In certain implementations, the cable 310 includes a flexible printed circuit (FPC), which can be configured to pass through both hinges 300 in the audio eyeglasses 10, as illustrated in FIG. 6. The FPC implementations of the cable 310 are designated by FPC 700, in FIG. 7. The FPC 700 shown in FIG. 7 is illustrated in two sections, separated by a border. This illustration is intended to show particular characteristics of the distinct segments within this perspective.

As shown in FIGS. 6 and 7, the FPC 700 is configured to extend from the lens region 30 to at least one of the arms 40. In particular implementations, the FPC 700 extends through a respective hinge 300 to a corresponding one of the arms 40. The cross-sectional view of the FPC 700 in FIG. 7 illustrates two distinct segments: a first segment 710 that is located in the lens region 30 (FIG. 6), and a second segment 720 that is located proximate the joint 730 between the lens region 30 and the arm 40. In various implementations, the joint 730 includes a hinge 300, as described herein with respect to FIGS. 1 and 3-5. The second segment 720 is sized to pass through the hinge 300, in the area proximate the joint 730. The second segment 720 can also be referred to as a single-sided segment, while the first segment 710 can also be referred to as a double-sided segment. In some cases, the second segment 720 extends for a portion of the length of a respective arm 40, and in particular cases, the second segment 720 extends to the electronics 70 in the arm 40 (e.g., a transducer or other electronic component described herein).

As seen in FIG. 7, the first segment 710 (or, double-sided segment) includes two layers of conductive material 750a, 750b connected by at least one via 760 and separated by an insulating layer 770. The conductive material layers (first) 750a, (second) 750b and the via 760 can be formed of a common conductive material, e.g., a metal such as copper, or aluminum, or a conductive polymer such as a metal-filled polymer. The insulating layer 770 can include any conventional insulating circuit material such as silicon, silicon germanium or the like. Additional insulating layer(s) 770 are shown in the first segment 710 which can be formed of a similar material to the insulating layer 770 separating the first and second conductive material layers 750a, 750b.

With continuing reference to FIGS. 6 and 7, the second segment 720 is continuous with the first segment 710, such that the electrical pathways between the two segments are uninterrupted. The second segment 720, which is located proximate the joint 730 between the lens region 30 and the arm 40 (FIG. 6) has only one of the conductive material layers, namely, the first conductive material layer 750a. That is, the FPC 700 transitions from the first segment 710 (with both conductive material layers 750a, 750b) to the second segment 720 (with the first conductive material layer 750) proximate the hinge 300. In this sense, with additional reference to FIG. 5, the second segment 720 passes through the cavity 330 in the hinge 300, while the first segment 710 remains outside of that cavity 330. In some particular cases, the FPC 700 extends through both arms 40 as well as the lens region 30, where the second segment 720 is only located proximate the respective joints 730 between the lens region 30 and the arms 40, e.g., a short distance from each of the hinges 330. However, in other implementations, the FPC 700 includes the first segment 710 spanning the lens region 30 and transitioning to the second segment 720 proximate the hinge 300, where the second segment 720 continues to a mounting location proximate the electronics 70 (e.g., the transducer 80) in the arm(s) 40 (FIG. 1).

In various particular implementations, the first conductive material layer 750a is thinner than the second conductive material layer 750b, regardless of differences in the type of conductive material used to form those layers. In certain cases, the second conductive material layer 750b has a thickness ($T_2$) at least three times a thickness ($T_1$) of the first conductive material layer 750a (FIG. 7).

In various implementations, the first segment 710 (having both the first and second conductive materials 750a, 750b) has a lesser impedance than the second segment 720 (having only the first conductive material layer 750a). That is, the first segment 710, which can span the majority of the length of the FPC 700, is less susceptible to impedance concerns than the second segment 720. Conversely, the second segment 720 can have a greater bend cycle life than the first segment 710. In this sense, the two-segment configuration of FPC 700 allows for impedance control over a majority of the length of the circuit, while enhancing bend cycle life in areas of the circuit that pass through the hinge 300. This configuration permits a thin FPC design (into the page, FIG. 6), such that the FPC 700 has a thickness of approximately 2 millimeters (mm) or less, and can be as thin as 1.5 mm in some implementations. The thin configuration of FPC 700 allows for a natural-looking lens region 30 and arms 40, which are not thickened by bulky circuitry. This can enhance the aesthetic appeal of the audio eyeglasses 10 without compromising electrical performance.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. Audio eyeglasses comprising:
   a frame for resting on a head of a user, the frame comprising:
      a lens region;
      a pair of arms extending from the lens region; and
      a hinge coupling the lens region and one of the pair of arms, the hinge comprising:
         a body;
         a friction element coupled to the body for damping the movement of the arm relative to the lens region; and
         a cavity within the body, the cavity comprising a first opening to a pathway in the lens region, and a second opening to an additional pathway in the arm, wherein the first opening and the second opening are wider than the cable, and the first opening is wider than the second opening, wherein an offset between the first and second openings causes a cable extending through the cavity to exhibit at least one bend between the first and second openings, the hinge permitting movement of the arm relative to the lens region; and
   an electro-acoustic transducer at least partially housed in the frame and comprising a sound-radiating surface for providing an audio output.

2. The audio eyeglasses of claim 1, wherein the hinge has a contoured edge at an interface with the arm and an additional contoured edge at a surface thereof adjacent the second opening.

3. The audio eyeglasses of claim 1, wherein the hinge is fixed within a slot in the lens region.

4. The audio eyeglasses of claim 1, further comprising a set of pins coupling the hinge to the arm.

5. The audio eyeglasses of claim 4, wherein the set of pins comprises an upper pin and a lower pin each extending through a respective mating slot in the hinge, wherein neither the upper pin nor the lower pin extends through the cavity to interfere with the cable.

6. The audio eyeglasses of claim 1, wherein the friction element comprises at least one of a silicone damper or a spring-loaded device.

7. The audio eyeglasses of claim 1, wherein the friction element is coupled with an outer surface of the body.

8. The audio eyeglasses of claim 1, wherein the friction element extends into a slot or a mating groove in the body.

9. The audio eyeglasses of claim 1, further comprising an additional hinge coupling the lens region and the second one of the pair of arms, the additional hinge comprising:
   a body;
   a friction element coupled to the body for damping the movement of the arm relative to the lens region; and
   a cavity within the body, the cavity sized to accommodate the cable extending therethrough.

10. The audio eyeglasses of claim 1, wherein the hinge substantially obstructs the cable from view when the audio eyeglasses are in an open position, and completely obstructs the cable from view when the audio eyeglasses are in a closed position.

11. The audio eyeglasses of claim 1, wherein the cable comprises a flexible printed circuit (FPC).

12. The audio eyeglasses of claim 1, further comprising:
   a controller connected with the electro-acoustic transducer; and
   an interface connected with the controller.

13. The audio eyeglasses of claim 12, wherein the interface comprises a button or a capacitive touch interface.

14. The audio eyeglasses of claim 12, wherein the interface comprises a compressible interface that allows a user to squeeze one or more sections of the arms to initiate a user interface command.

15. The audio eyeglasses of claim 12, further comprising an inertial measurement unit (IMU) connected with the controller for enabling at least one of location-based control functions or orientation-based control functions.

16. Audio eyeglasses comprising:
   a frame for resting on a head of a user, the frame comprising:
      a lens region;
      a pair of arms extending from the lens region; and
      a hinge coupling the lens region and one of the pair of arms, the hinge comprising:
         a body;
         a friction element coupled to the body for damping the movement of the arm relative to the lens region; and
         a cavity within the body, the cavity sized to accommodate a cable extending therethrough, wherein the cavity has a first opening to a pathway in the lens region, and a second opening to an additional pathway in the arm, wherein the first opening and the second opening are wider than the cable, and the first opening is wider than the second opening, and wherein the hinge permits movement of the arm relative to the lens region; and
   an electro-acoustic transducer at least partially housed in the frame and comprising a sound-radiating surface for providing an audio output.

17. The audio eyeglasses of claim 16, wherein the first opening has a width that is approximately 3-5 times a width of the second opening.

18. Audio eyeglasses comprising:
   a frame for resting on a head of a user, the frame comprising:
      a lens region;
      a pair of arms extending from the lens region; and
      a hinge coupling the lens region and one of the pair of arms, the hinge comprising:
         a body;
         a friction element coupled to the body for damping the movement of the arm relative to the lens region; and
         a cavity within the body, the cavity sized to accommodate a cable extending therethrough, the hinge permitting movement of the arm relative to the lens region, wherein the cavity comprises a first opening to a pathway in the lens region, and a second opening to an additional pathway in the arm, wherein the first opening is wider than the second opening; and
   an electro-acoustic transducer at least partially housed in the frame and comprising a sound-radiating surface for providing an audio output, wherein the electro-acoustic transducer is mounted in a first one of the arms that is coupled to the lens region by the hinge, and wherein the cable is fixed at a first location to a circuit board in the other one of the arms, extends through the lens region, and is fixed at a second location proximate the electro-acoustic transducer in the first one of the arms, wherein the cable comprises at least one bend in a portion contained within the cavity for controlling tension on the cable during the movement of the arm relative to the lens region.

19. The audio eyeglasses of claim 18, wherein an offset between the first and second openings causes the cable to exhibit the at least one bend in the portion between the first and second openings.

* * * * *